Oct. 8, 1957
A. G. DEAN
2,809,242
SIGNAL PICK-UP AND TREAD-CLEANING
SHUNT BLOCK AND CONNECTIONS
Filed July 26, 1954
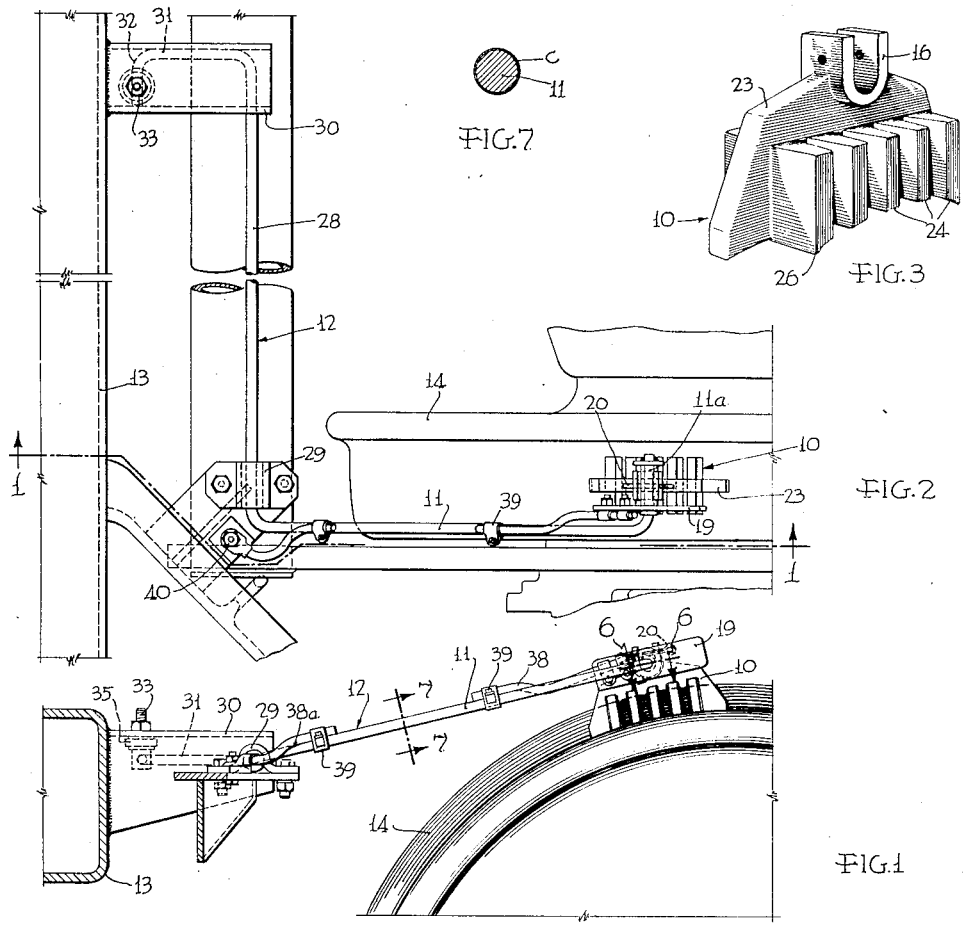
INVENTOR
Albert G. Dean
BY
Wm. R. Glisson
ATTORNEY

United States Patent Office 2,809,242
Patented Oct. 8, 1957

2,809,242

SIGNAL PICK-UP AND TREAD-CLEANING SHUNT BLOCK AND CONNECTIONS

Albert G. Dean, Narberth, Pa., assignor to The Budd Company, Philadelphia, Pa., a corporation of Pennsylvania Application July 26, 1954, Serial No. 445,783

7 Claims. (Cl. 191—45)

This invention relates to a wheel tread shoe or shunt block for cleaning the tread and aiding signal operation and connections therefor and has for an object the provision of improvements in this art.

One of the particular objects of the invention is to provide a shunt block which will have improved tread-cleaning characteristics.

Another object is to provide a shunt block which will have improved dirt rejecting characteristics.

Another object is to provide a shunt block which will give good service over a wide range of wear and which will leave only a small amount of metal to be thrown away.

Another object is to provide a shunt block which is easy and relatively inexpensive to manufacture.

Another object is to provide a shunt block with improved electrical connections which will provide more dependable signal transmission and longer service without breakdown.

The above and other objects and advantages of the invention will be apparent from the following description of an exemplary embodiment, reference being made to the accompanying drawings, wherein:

Fig. 1 is a side elevation of a rail car wheel and part of a truck on which the shunt block and connections of the present invention are installed;

Fig. 2 is a plan view of the parts shown in Fig. 1;

Fig. 3 is a perspective view of the shunt block alone;

Fig. 4 is an enlarged side view, partly in section, of the shunt block;

Fig. 5 is a top plan view of the shunt block;

Fig. 6 is an enlarged partly broken section showing the torsion spring and connections;

Fig. 7 is a section through the torsion rod on the line 7—7 of Fig. 1; and

Fig. 8 is a side elevation of a modified form of shunt block.

The shunt block or signal contact shoe 10 is mounted on the inturned end 11a of an arm 11 of a torsion spring 12 mounted on the truck frame 13 which carries the wheels 14 upon the treads on which the shunt blocks ride.

The shunt block preferably is made of a metal such as bronze which has high electrical conductivity and good wearing characteristics and which keeps the tread clean at all times and coated with a very thin layer of the shoe material. The wheels are of cast iron or steel. This assures good clean contact at the shunt block and also between tread and track if the track is clean. If only cleaning of the tread is desired the block can be made of cast iron, steel or other hard metal.

The back of the shunt block or shoe is formed with a U-shaped yoke 16 which embraces a bronze spool 17 carried on the arm end 11a. The end flange 17a of the spool is rigidly secured to the arm end 11a, as by welding 18, and at the other end the spool carries an elongated anti-tip plate 19 which prevents the shunt block or shoe 10 from turning over if one end should become caught on the wheel tread, as by ice thereon, for example. The spool is retained in the yoke 16 by any suitable means, such for example as the cotter pin 20.

The shunt block or shoe 10 is made of a special shape to conserve material, provide long wear, and to effectively clean the tread at all stages of its progressive wear. It comprises a narrow longitudinal rib 23 to which the yoke 16 is secured, and a plurality of transverse ribs 24 secured to the longitudinal rib 23. The yoke, longitudinal rib 23, and transverse ribs 24 are herein shown to be made integral, as in a single casting.

The transverse ribs 24 are tapered on both sides inward toward the longitudinal rib and, if desired, as shown in Fig. 8, may also be tapered on both sides outward to the longitudinal rib. Deep spaces 25 are formed between the transverse ribs, the spaces being approximately as wide circumferentially as the transverse ribs.

This shape causes dirt to be shed easily and provides good service until the transverse ribs are worn back almost to their roots at the longitudinal rib.

When new, the shunt blocks 10 are formed with narrow transverse projecting ribs 26 which wear quickly into mating conformity with the tread. This is useful when a new block is placed in service on a worn tread since the narrow ribs quickly wear into the shape of the tread to provide cleaning and coating action before the surface of the block as a whole has worn down to fit the tread.

The torsion spring 12 has a long body portion 28 which near its outer end is mounted in a bearing of a bracket 29 and at its inner end is mounted in a bearing of a bracket 30. An inner arm 31 has a turned end 32 carried by an aperture in the head of an adjusting bolt 33 carried by the bracket 30. A resilient compressible sandwich washer 35 provides for adjustment by the nut of the bolt.

In previous forms an electrical jumper cable was connected between the shunt block and a fixed part of the truck frame and this jumper cable gave much trouble with breakage because of the movements of the shunt block or shoe and arm. According to the present invention this trouble is greatly reduced or eliminated by coating the torsion arm 11 of steel with a highly conductive material c, such for example as copper as shown in Fig. 7. Now by having a bronze spool in rubbing contact with the yoke of the shunt block or shoe the jumper cable 38 can be secured to the anti-tip plate 19 which does not have any appreciable movement relative to the arm 11. The cable 38 is connected to the copper-coated arm, as by a clamp sleeve or sleeves 39 soldered or brazed to the arm and cable, and the end of another jumper cable 38a is secured to the truck frame 13, as by a bolt 40. Since the arm 11 when coated with copper is itself a good conductor the cable 38 need not be continuous along the full length of the arm, merely being connected between plate 19 and the arm 11 at one end and between the arm 11 and the truck frame at the other end, as shown. The torsion spring does not need to be coated throughout its full length for purposes of conductivity but it may be coated, if desired, to minimize rusting.

The parts of the modification shown in Fig. 8 are designated by the same reference characters as the first embodiment but with a prime (') added. In this form the ribs decrease in circumferential thickness progressively from their inner ends in a radially outward direction.

It is thus seen that the invention provides an efficient long-wearing shunt block and simple connections which will provide good current pick up and transmission.

While certain forms of the invention have been disclosed by way of illustration it is to be understood that there may be various forms within the scope of the invention.

What is claimed is:

1. A shunt block installation for cleaning a track wheel tread and aiding signal current pick-up, comprising a shunt block or shoe for engaging a wheel tread, and means for continuously urging the block against the tread, said block comprising a back rib which is relatively long circumferentially and relatively narrow axially with respect to the wheel, and circumferentially spaced-apart transverse ribs carried by said back rib, the axial length of said transverse ribs being much greater than the axial thickness of the back rib and the transverse ribs extending inward radially from said back rib whereby to leave spaces between the transverse ribs which are open axially below the back rib and which are open radially on each side of the back rib.

2. A shunt block installation as set forth in claim 1, further characterized by the fact that said transverse ribs vary in circumferential thickness along their length axially, being thickest adjacent their junction with the back rib.

3. A shunt block installation as set forth in claim 1, further characterized by the fact that said circumferentially extending back rib has an upwardly opening U-shaped yoke on its back with the bottom of the U-shaped yoke forming an axially extending bearing seat, and which further includes a spool of highly conductive metal fitting in the bearing seat in the yoke and held down by said means which urges the block against the wheel tread, and means carried by the yoke for retaining said spool therein.

4. A shunt block installation as set forth in claim 3, which further includes a circumferentially elongated anti-turn-over rib carried at an end of said spool, and conductor means connecting said anti-turn-over rib to fixed parts on which the wheel is mounted.

5. A shunt block installation as set forth in claim 3, which further includes a circumferentially elongated anti-turn-over rib carried at an end of said spool, and conductor means connecting said anti-turn-over rib to fixed parts on which the wheel is mounted, part of said conductor means comprising an arm on which said spool is mounted and which constitutes the means which urges the block against the wheel tread, said arm being coated with a highly conductive material.

6. A shunt block installation as set forth in claim 1, further characterized by the fact that said transverse ribs vary in circumferential thickness along their length radially, being thinnest adjacent their junction with the back rib.

7. A shunt block installation as set forth in claim 2, further characterized by the fact that said transverse ribs also vary in circumferential thickness along their length radially, being thinnest adjacent their junction with the back rib.

References Cited in the file of this patent

UNITED STATES PATENTS

| | | |
|---|---|---|
| 229,641 | Rider | July 6, 1880 |
| 2,385,582 | Larsson | Sept. 25, 1945 |
| 2,457,326 | Sloane | Dec. 28, 1948 |
| 2,685,621 | Callender | Aug. 3, 1954 |